(12) United States Patent
Kim et al.

(10) Patent No.: US 7,952,991 B2
(45) Date of Patent: May 31, 2011

(54) METHOD AND APPARATUS FOR TRANSMITTING AND RECEIVING CONTROL INFORMATION IN A SINGLE CARRIER FDMA SYSTEM

(75) Inventors: Young-Bum Kim, Seoul (KR); Ju-Ho Lee, Suwon-si (KR); Youn-Hyoung Huh, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 335 days.

(21) Appl. No.: 12/030,525

(22) Filed: Feb. 13, 2008

(65) Prior Publication Data
US 2008/0212464 A1 Sep. 4, 2008

(30) Foreign Application Priority Data
Feb. 14, 2007 (KR) .................. 10-2007-0015634

(51) Int. Cl.
*H04J 11/00* (2006.01)
(52) U.S. Cl. .................. 370/210; 370/209; 370/208
(58) Field of Classification Search .................. None
See application file for complete search history.

(56) References Cited

U.S. PATENT DOCUMENTS

| | | | |
|---|---|---|---|
| 7,613,245 B2 | 11/2009 | Cho et al. | |
| 7,660,327 B2 * | 2/2010 | Katar et al. | 370/461 |
| 2002/0110181 A1 * | 8/2002 | Willenegger | 375/141 |
| 2002/0181390 A1 * | 12/2002 | Mody et al. | 370/208 |
| 2005/0025039 A1 * | 2/2005 | Hwang et al. | 370/206 |
| 2005/0036461 A1 * | 2/2005 | Keil et al. | 370/329 |
| 2005/0111492 A1 * | 5/2005 | Kang et al. | 370/480 |
| 2005/0128993 A1 * | 6/2005 | Yu et al. | 370/342 |
| 2005/0201474 A1 * | 9/2005 | Cho et al. | 375/260 |
| 2006/0262871 A1 * | 11/2006 | Cho et al. | 375/260 |
| 2006/0291431 A1 * | 12/2006 | Pajukoski et al. | 370/335 |
| 2007/0036179 A1 * | 2/2007 | Palanki et al. | 370/491 |
| 2007/0076587 A1 * | 4/2007 | Kwon et al. | 370/208 |
| 2007/0097927 A1 * | 5/2007 | Gorokhov et al. | 370/335 |
| 2007/0189151 A1 | 8/2007 | Pan et al. | |

FOREIGN PATENT DOCUMENTS

| | | |
|---|---|---|
| EP | 1 720 310 | 5/2006 |
| KR | 1020060115027 | 11/2006 |
| WO | WO 2006/107835 | 10/2006 |

* cited by examiner

*Primary Examiner* — Chi H Pham
*Assistant Examiner* — Kouroush Mohebbi
(74) *Attorney, Agent, or Firm* — The Farrell Law Firm, P.C.

(57) ABSTRACT

Provided is a method and an apparatus for transmitting a large quantity of control information in a mobile communication system. When there is no uplink data to be transmitted, a UE spreads second control information, a quantity of which is less than or equal to a pre-defined threshold, by using a ZC sequence cyclic-shifted according to resource blocks, each of which indicates at least one time interval used for a transmission of the second control information. When there is uplink data to be transmitted, the UE performs TDM of the uplink data with third control information. When there is no uplink data to be transmitted and the quantity of control information exceeds a pre-defined threshold, or when the first control information includes various types of information, the UE spreads the first control information in a time domain by the orthogonal codes.

24 Claims, 10 Drawing Sheets

METHOD AND APPARATUS FOR TRANSMITTING AND RECEIVING CONTROL INFORMATION IN A SINGLE CARRIER FDMA SYSTEM

PRIORITY

This application claims priority under 35 U.S.C. §119(a) to a Korean Patent application entitled "Method And Apparatus For Transmitting And Receiving Control Information In A Single Carrier FDMA System" filed in the Korean Industrial Property Office on Feb. 14, 2007 and assigned Serial No. 2007-15634, the contents of which are hereby incorporated by reference.

BACKGROUND OF THE INVENTION

1. Field of the Invention

The present invention relates to a mobile communication system, and more particularly to a method and an apparatus for transmitting and receiving control information.

2. Description of the Related Art

In the field of mobile communication technology, active research for an Orthogonal Frequency Division Multiple Access (OFDMA) scheme or a Single Carrier-Frequency Division Multiple Access (SC-FDMA) scheme similar to the OFDMA scheme is being conducted as a scheme useful for high-speed data transmission through a wireless channel. The $3^{rd}$ Generation Partnership Project (3GPP), which is an organization for asynchronous cellular mobile communication standardization, is currently researching a Long Term Evolution (LTE) system, which is a next generation mobile communication system, as a basis for the multiple access schemes.

In the LTE system, transport formats of uplink control information are divided according to an existence or absence of data transmission. The uplink control information includes ACKnowledgement (ACK)/Negative ACKnowledgement (NACK) information as a response to downlink data transmission, Channel Quality Indication (CQI) information for feeding back a downlink channel state, and Multiple Input Multiple Output (MIMO) information necessary to operate multiple transmission/reception antennas.

Either when data and control information are simultaneously transmitted or when only data is transmitted in an uplink, the data and the control information are multiplexed before transmission. In contrast, when only control information is transmitted without data, a particular allocated frequency band is used to transmit the control information.

FIG. 1 illustrates a structure of control information when only the control information is transmitted in an uplink in a 3GPP LTE system. In FIG. 1, the horizontal axis indicates the time domain and the vertical axis indicates the frequency domain. The time domain has a range of one sub-frame 102 and the frequency domain has a range of a transmission bandwidth 114.

Referring to FIG. 1, the sub-frame 102, which is a basic transmission unit of uplink, has a length of 1 ms, and each sub-frame includes two slots 104 and 106, each of which has a length of 0.5 ms. Each of the slots 104 and 106 includes a plurality of Long Blocks (LBs) 108, each of which is also called a Long SC-FDMA Symbol. Each of the slots shown in FIG. 1 includes seven LBs 108.

In the frequency domain, the smallest transmission unit is a sub-carrier, and a basic unit for resource allocation is a Resource Unit (RU) 110 or 112. The RU 110 or 112 includes a plurality of sub-carriers and a plurality of LBs. In the structure shown in FIG. 1, one RU includes 12 sub-carriers and 14 LBs. In the structure, one RU may include not only continuous sub-carriers but also discontinuous sub-carriers having a regular interval between them, so as to obtain frequency diversity.

Within one sub-frame 102, control information is transmitted at the $1^{st}$, $2^{nd}$, $3^{rd}$, $5^{th}$, $6^{th}$, $7^{th}$, $8^{th}$, $9^{th}$, $10^{th}$, $12^{th}$, $13^{th}$, and $14^{th}$ LBs, while a pilot (which is also called a Reference Signal (RS)) is transmitted at each of the $4^{th}$ and $11^{th}$ LBs. The pilot includes pre-promised sequences, and is thus used in channel estimation for coherent demodulation in a receiver side.

In the LTE system, when only control information is transmitted in an uplink, the control information is transmitted through a pre-defined control information frequency band. In the present specification, this type of transmission scheme is called a "type A" transmission scheme. In the "type A" transmission scheme, the number of LBs for transmission of control information and the number of LBs for transmission of the RS, which are included in the control information frequency band, may change according to the case. Referring to FIG. 1, the control information frequency band corresponds to the RUs 110 and 112 located at both ends of the system transmission band 114.

In general, a frequency band for transmitting control information is configured RU-by-RU, and a plurality of RUs are used for transmission of control information according to the number of User Equipments (UEs) to be multiplexed. Further, frequency hopping may be employed in order to increase frequency diversity during one sub-frame, wherein the frequency hopping may be performed for each slot.

Referring to FIG. 1, control information #1 is transmitted through a pre-allocated frequency band 110 in the first slot 104, and is frequency-hopped and then transmitted through another pre-allocated frequency band 112 in the second slot 106. Not shown, control information #2 is transmitted through the frequency band 112 in the first slot 104, and is frequency-hopped and then transmitted through the frequency band 110 in the second slot 106.

A Code Division Multiplexing (CDM) scheme may be used in order to multiplex uplink control information including ACK/NACK information, CQI information, MIMO information, etc. between different users. The CDM scheme is more robust against an interference signal than the Frequency Division Multiplex (FDM) scheme.

The Zadoff-Chu (ZC) sequence is being discussed as a sequence to be used for a CDM scheme of control information. Since the Zadoff-Chu sequence has a constant signal level (constant envelope) in the time and frequency domain, the Zadoff-Chu sequence has a good Peak to Average Power Ratio (PAPR) and shows a good channel estimation performance in the frequency domain.

The Zadoff-Chu sequence has zero circular autocorrelation for a non-zero shift. Therefore, UEs using the same Zadoff-Chu sequence for transmission of control information can be given different time domain cyclic shift values of the Zadoff-Chu sequence in order to discriminate between the UEs. The cyclic shift values are set to be different according to users and to be larger than the maximum transmission delay value of a wireless transmission path, so as to maintain orthogonality between the users. Therefore, the number of users capable of having multiple access is determined by the length of the Zadoff-Chu sequence and the cyclic shift values.

Hereinafter, mapping and transmission of a control information signal and a Zadoff-Chu sequence in the "type A" transmission scheme will be described with reference to FIG. 1. Provided that a Zadoff-Chu sequence having a length of N allocated to UE i is defined by $g_{(n+\Delta i) \bmod N}$ (n=0, ..., N−1, $\Delta_i$ indicates a time domain cyclic shift value for UE i, and i indicates a UE index for identifying a UE) and a control information signal to be transmitted by UE i is denoted by $m_{i,k}$ (k=0, ..., $N_{LB}$, wherein $N_{LB}$ refers to the number of LBs within a sub-frame), a signal $C_{i,k,n}$ (the $n^{th}$ sample of $k^{th}$ LB of UE i) mapped to each LB is defined by Equation (1) below:

$$C_{i,k,n} = g_{(n+\Delta i) \bmod N} \cdot m_{i,k} \quad (1)$$

In Equation (1), k=0, ..., $N_{LB}$, n=0, ..., N−1, and $\Delta i$ indicates a time domain cyclic shift value of a Zadoff-Chu sequence for UE i.

In the structure shown in FIG. 1, $N_{LB}$ indicating the number of LBs within one sub-frame is 12, and the length N of a Zadoff-Chu sequence is also 12, which is equal to the number of sub-carriers included in one RU. In FIG. 1, the UE index i is omitted. In a view of one UE, a time domain cyclic-shifted Zadoff-Chu sequence is applied to each LB, and a control information signal to be transmitted is configured by multiplying the time domain cyclic-shifted Zadoff-Chu sequence by one modulation symbol for each LB. Therefore, a maximum number of $N_{LB}$ control information modulation symbols for each sub-frame can be transmitted. That is, in the sub-frame shown in FIG. 1, a maximum of 12 control information modulation symbols can be transmitted.

When both control information and data are transmitted, the data and the control information are time-division-multiplexed, mapped to time-frequency resources allocated for transmission of the data, and then transmitted. In the present specification, this type of transmission scheme is called a "type B" transmission scheme. In general, a Node B schedules the time-frequency resources RU by RU. FIG. 2 illustrates a structure of control information transmitted according to the "type B" transmission scheme in a 3GPP LTE system. For a system transmission bandwidth 208, one sub-frame 202 has a length of 1 ms, and includes two slots 204 and 206, each of which has a length of 0.5 ms. Each of the slots includes seven LBs 218.

Referring to FIG. 2, within one sub-frame 202, control information and data are time division multiplexed and transmitted at the $1^{st}$, $2^{nd}$, $3^{rd}$, $5^{th}$, $6^{th}$, $7^{th}$, $8^{th}$, $9^{th}$, $10^{th}$, $12^{th}$, $13^{th}$, and $14^{th}$ LBs, while an RS is transmitted at each of the $4^{th}$ and $11^{th}$ LBs. Further, within the transmission bandwidth 208, frequency bands 214 and 216 have been allocated for transmission of "type A" control information. Therefore, it is possible to use the "type B" scheme for transmission of control information in frequency bands other than the frequency bands 214 and 216. UE #1 time division multiplexes and transmits control information and data in the frequency band 210, and UE #2 time division multiplexes and transmits control information and data in the frequency band in the frequency band 212.

As described above, in transmitting uplink control information, UEs employ the "type B" scheme or the "type A" scheme according to whether there is uplink data to be transmitted together with the uplink control information. However, when there is a large quantity of control information to be transmitted, resources for the time domain, the frequency domain, and the code domain may be insufficient.

The quantity of control information varies according to the type of the control information. CQI information for feeding back a downlink channel state is described below as an example. The CQI information includes a wideband CQI indicating a channel state of the entire system transmission band and a sub-band CQI indicating a channel state of a particular frequency band. A Node B performs a scheduling operation for determining resources to be allocated to a UE based on CQI information fed back from the UE. Frequency selective scheduling requires a sub-band CQI. The system transmission band includes a plurality of sub-bands, and each of the sub-bands has a size corresponding to a multiple of the RU, which is the smallest unit of scheduling by the Node B.

Given a 10 MHz transmission band, an LTE system may employ a total of 50 RUs, each of which includes 12 sub-carriers. If each sub-band includes two RUs, the LTE system includes a total of 25 sub-bands and thus a UE feeds back 25 sub-band CQIs. In general, in considering the signaling overhead, it is preferable to feed back CQI information for a part of sub-bands having the best channel condition from among all sub-bands. For example, if it is assumed that a sub-band CQI is fed back for three sub-bands having the best channel condition from among the 25 sub-bands and each sub-band CQI is indicated by 5 bits, the number of all signaling bits necessary for feeding back all sub-band CQI information is calculated as follows. That is, a total of 27 bits, which include 12 bits (=ceil{$\log_2(_{25}C_3)$}) for indicating what sub-band the CQI information relates to, and 15 bits (=5*3) for indicating the channel state of each sub-band, are necessary in order to feed back all sub-band CQI information, wherein ceil { } refers to a ceiling function.

In view of scheduling, it is preferable to transmit the sub-band CQI information for each minimum transmission time unit with as short a transmission delay as possible. When a convolutional coding having a coding rate of 1/3 and applying 8 tail bits is performed, an encoded stream including 105 bits (=(27+8)*3 bits) is generated. Then, if the encoded stream undergoes a Quadrature Phase Shift Keying (QPSK) modulation, 52.5 modulation symbols (=105/2) are generated.

In considering that a maximum of 12 modulation symbols can be transmitted according to the "type A" scheme within one sub-frame in the case of example shown in FIG. 1, it is necessary to define a transmission scheme for a case where the quantity of information to be transmitted (52.5 modulation symbols) is larger than the quantity of transmissible information (12 modulation symbols).

SUMMARY OF THE INVENTION

Accordingly, the present invention has been made to solve the above-mentioned problems occurring in the prior art, and the present invention provides a method and an apparatus for transmitting a large quantity of control information in a mobile communication system.

Also, the present invention provides a method and an apparatus for allocating a separate frequency band for transmitting a large quantity of control information and spreading the control information in a time domain, thereby improving a transmission bit rate.

In accordance with an aspect of the present invention, there is provided a method for transmitting control information in a Single Carrier-Frequency Division Multiple Access (SC-FDMA) system, the method including generating first control information to be transmitted; spreading control information symbols including the first control information by an orthogonal code that has a spreading factor according to a quantity of the first control information and that has a different index allocated to an User Equipment (UE) by a Node B; performing a Discrete Fourier Transform (DFT) on the spread signal and mapping the Discrete Fourier Transformed signal to a first frequency region allocated for a transmission of the first control information, thereby generating a frequency domain signal; mapping the frequency domain signal to SC-FDMA symbols through Inverse Fast Fourier Transform (IFFT); and adding Cyclic Prefix (CP) for preventing inter-symbol interference to the SC-FDMA symbols and then transmitting a CP-added signal to the Node B.

In accordance with another aspect of the present invention, there is provided a User Equipment (UE) apparatus for transmitting control information in an SC-FDMA system, the UE apparatus including a control signal generator for spreading control information symbols including first control information to be transmitted by an orthogonal code that has a spreading factor according to a quantity of the first control information and has a different index allocated to a UE by a Node B; a Discrete Fourier Transform (DFT) block for performing DFT on a spread signal; a mapper for mapping the DFTed signal to a first frequency region allocated for a transmission of the first control information, thereby generating a frequency domain signal; an Inverse Fast Fourier Transform (IFFT) block for mapping the frequency domain signal to SC-FDMA symbols through IFFT; and a Cyclic Prefix (CP) adder for adding CP for preventing inter-symbol interference to the SC-FDMA symbols and then transmitting a CP-added signal to the Node B.

In accordance with another aspect of the present invention, there is provided a method for receiving control information in an SC-FDMA system, the method including extracting SC-FDMA symbols from a received signal by removing CP for preventing inter-symbol interference from the received signal; performing a Fast Fourier Transform (FFT) on the SC-FDMA symbols; demapping a signal mapped to a first frequency region allocated for transmission of first control information from a Fast Fourier Transformed signal; converting the demapped signal to a time domain signal through IFFT; extracting a control channel signal by demultiplexing the time domain signal; and acquiring the first control information by despreading the control channel signal by an orthogonal code that has a spreading factor according to a quantity of the first control information and has a different index allocated to a UE.

In accordance with another aspect of the present invention, there is provided a Node B apparatus for receiving control information in an SC-FDMA system, the Node B including a CP remover for extracting SC-FDMA symbols from a received signal by removing CP for preventing inter-symbol interference from the received signal; an Fast Fourier Transform (FFT) block performing an FFT on the SC-FDMA symbols; a demapper for demapping a signal mapped to a first frequency region allocated for a transmission of first control information from an Fast Fourier Transformed signal; an IFFT block for converting the demapped signal to a time domain signal through IFFT; a demultiplexer for extracting a control channel signal by demultiplexer the time domain signal; and a control channel signal receiver for acquiring the first control information by despreading the control channel signal by an orthogonal code that has a spreading factor according to a quantity of the first control information and has different index allocated to a UE.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear. Further, in the following description of the present invention, various specific definitions found in the following description are provided only to provide a general understanding of the present invention, and it is apparent to those skilled in the art that the present invention can be implemented without such definitions.

Specifically, the following description deals with transmission/reception operations of a UE and a Node B according to the present invention when uplink control information is transmitted through a particular frequency region of a system bandwidth in an SC-FDMA based cellular communication system.

When there is a large quantity of control information to be transmitted, only by the "type A" scheme for transmitting only control information without data through a pre-defined control information frequency band of uplink, it may be impossible to transmit the control information within a predetermined time. The control information includes ACK/NACK information as a response to downlink data, CQI information for feeding back a downlink channel state, and MIMO information necessary for operation of multiple transmission/reception antennas. As used herein, a transmission scheme for control information proposed by the present invention is called a "type C" scheme, for convenience of description.

Figure 1:
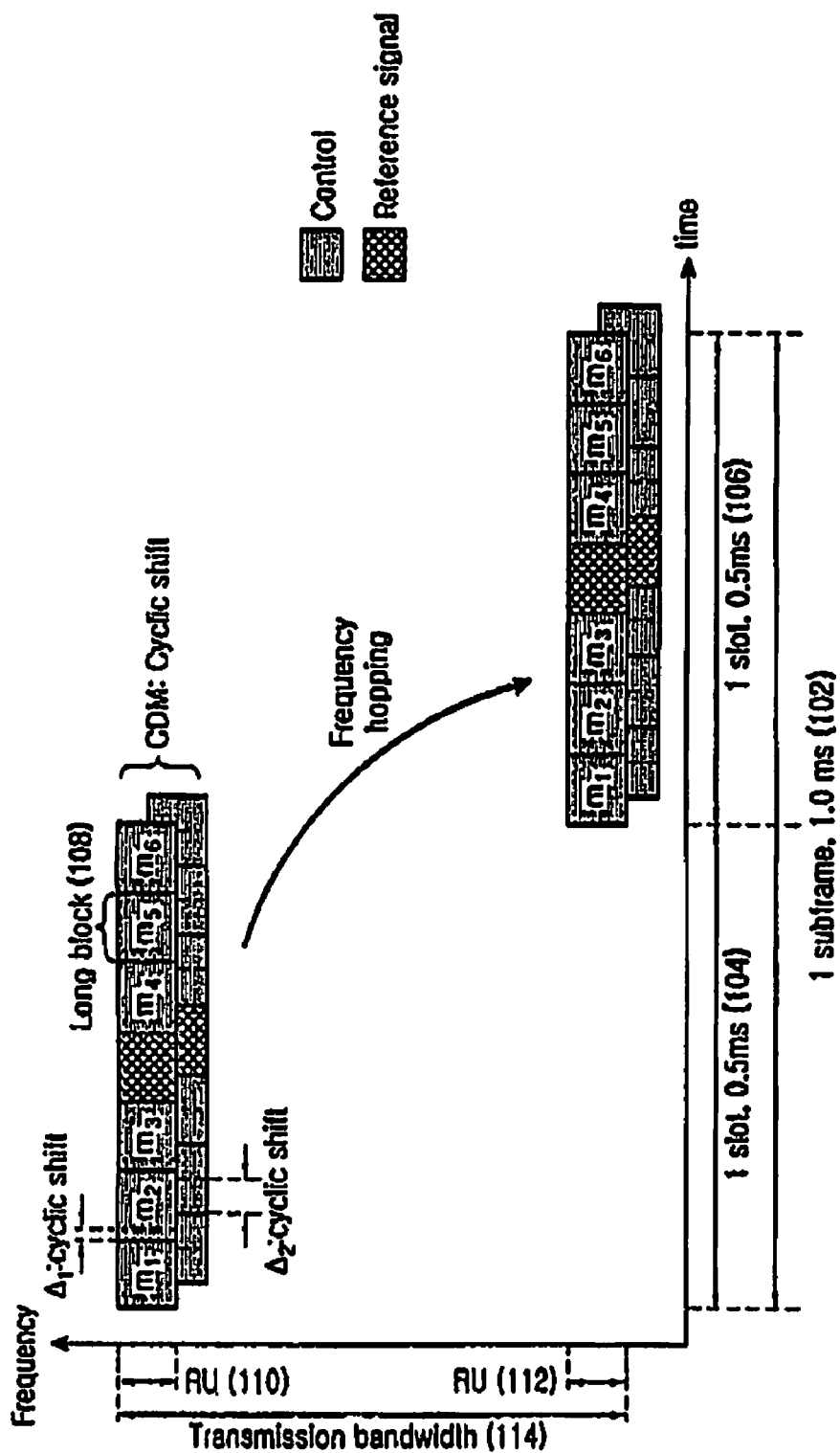
FIG. 1 illustrates a structure of control information when only the control information is transmitted in an uplink in a 3GPP LTE system.
Figure 2:
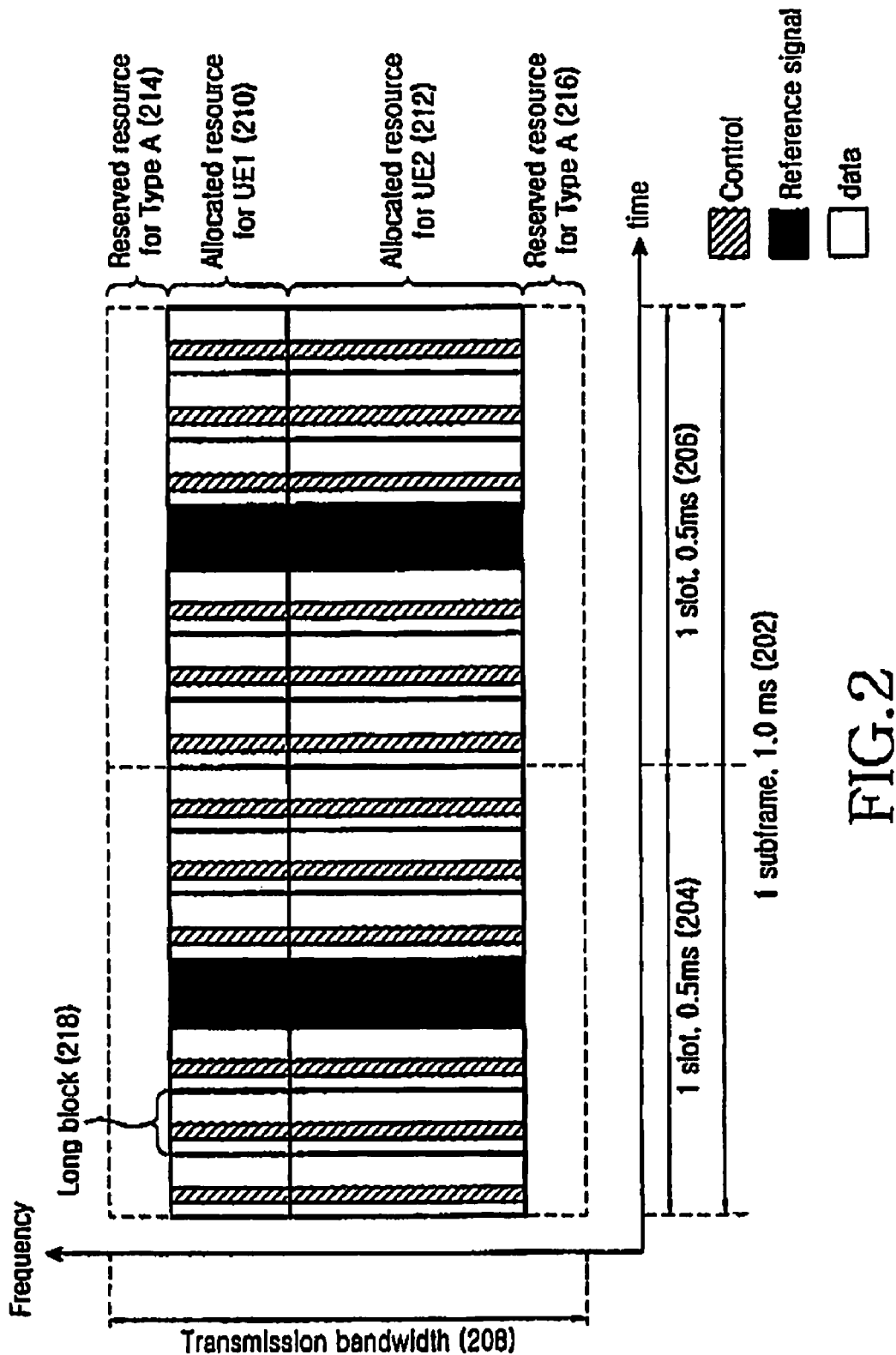
FIG. 2 illustrates a structure of control information transmitted according to the "type B" transmission scheme in a 3GPP LTE system.
Figure 3:
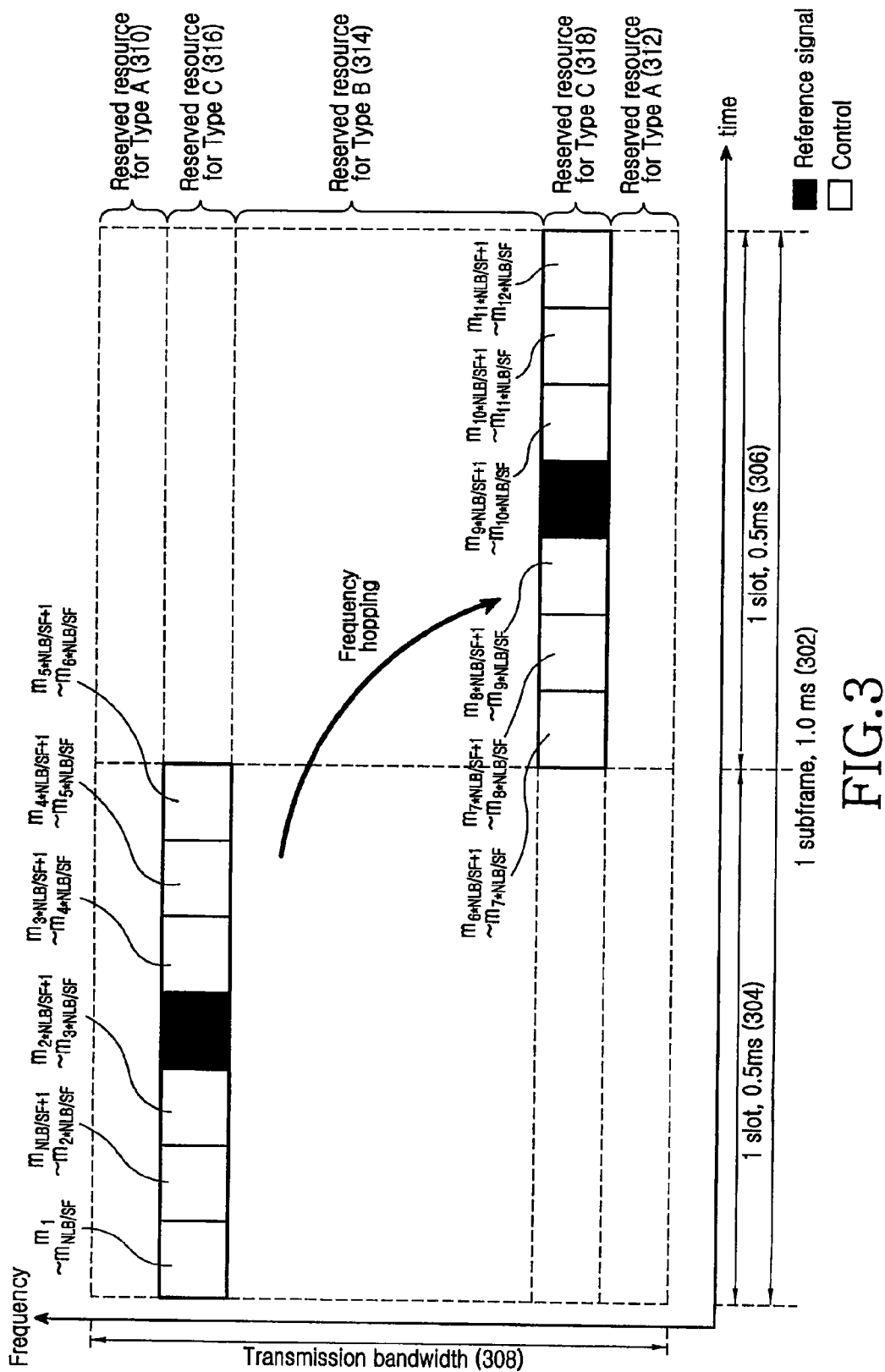
FIG. 3 illustrates a structure of transmitted control information according to an exemplary embodiment of the present invention.

FIG. 3 illustrates a structure of transmitted control information according to an exemplary embodiment of the present invention. For a system transmission bandwidth 308, one sub-frame 302 has a length of 1 ms, and includes two slots 304 and 306, each of which has a length of 0.5 ms. Each of the slots 304 and 306 includes seven LBs.

Hereinafter, the "type C" control information transmission scheme according to an exemplary embodiment of the present invention will be described below with reference to FIG. 3. Frequency regions according to the "type C" scheme are operated separately from frequency bands 310 and 312 allocated for the "type A" and a frequency band 314 allocated for the "type B." In the frequency regions of the "type C" scheme, a basic unit of the transmission band is an RU, and a plurality of RUs may be used for transmission of control information according to the "type C" scheme.

In the "type A" or "type C" control information transmission, frequency hopping may be performed slot-by-slot within one sub-frame in order to increase the frequency diversity. The slot-by-slot frequency hopping may be performed either between the same types of frequency bands or between different types of frequency bands. The slot-by-slot frequency hopping is pre-defined for the system operation so that the slot-by-slot frequency hopping can be commonly identified by both a UE and a Node B through signaling or system setting.

According to the transmission structure of the frequency regions 316 and 318 allocated for the "type C" scheme as shown in FIG. 3, within one sub-frame 102, control information is transmitted at the $1^{st}$, $2^{nd}$, $3^{rd}$, $5^{th}$, $6^{th}$, $7^{th}$, $8^{th}$, $9^{th}$, $10^{th}$, $12^{th}$, $13^{th}$, and $14^{th}$ LBs, while an RS is transmitted at each of the $4^{th}$ and $11^{th}$ LBs. The number of LBs for transmitting control information and the number of LBs for transmitting the RS, which are included in the control information frequency band, may change according to each case. Referring to FIG. 3, the frequency bands 310 and 312 allocated for the "type A" scheme are located at both outermost positions of the system transmission band 308, and the frequency bands 316 and 318 allocated for the "type C" scheme are located inside of the frequency bands 310 and 312 allocated for the "type A" scheme. However, those positions are only an example and can be adjusted during the system operation.

For example, the frequency bands 316 and 318 allocated for the "type C" scheme are located at outermost positions of the system transmission band 308, and the frequency bands 310 and 312 allocated for the "type A" scheme are located inside of the frequency bands 316 and 318 allocated for the "type C" scheme. For another example, only control information of the "type B" scheme and the "type C" scheme are transmissible without using the "type A" scheme. In this case, the frequency bands 316 and 318 allocated for the "type C" scheme are located at outermost positions of the system transmission band 308, and the frequency band 314 allocated for the "type B" scheme is located at the other locations of the system transmission band 308.

In the "type A" scheme, a CDM scheme based on a ZC sequence is used, so that one modulation symbol is mapped to each LB, so as to limit the quantity of control information transmissible within one sub-frame to have a small value. In the "type C" scheme, the ZC sequence is not used, and control information to be transmitted is spread with orthogonal codes, such as Walsh codes or Orthogonal Variable Spreading Factor (OVSF) codes, and is then mapped to an LB, so as to increase the quantity of control information transmissible within one sub-frame.

For example, one RU including 12 sub-carriers is allocated to frequency regions 316 and 318 of the "type C" scheme, and orthogonal codes having a spreading factor of 4 is used, so that three (i.e., 12/4) control information modulation symbols can be transmitted during one sub-frame. If the control information has been modulated according to the QPSK scheme and encoded with error correction codes having a coding rate of 1/3, the 36 modulation symbols are converted into 24 (i.e., 36*2/3) information bits. On the same conditions, 12 modulation symbols can be transmitted during one sub-frame according to the type "A" scheme. Therefore, the type "C" scheme can transmit three times (i.e., 36/12) as much control information as the control information transmissible by the type "A" scheme.

When each modulation symbol of the control information is put as $m_i$ (wherein i indicates an LB index, $i=1, \ldots, N_{LB}$, $N_{LB}$ refers to the number of LBs used for transmission of the control information within one sub-frame), according to a Spreading Factor (SF) used in the transmission of the control information, control information modulation symbols transmitted by each LB are defined as follows.

$1^{st}$ LB: $m_1, \ldots, m_{NLB/SF}$ $2^{nd}$ LB: $m_{NLB/SF+1}, \ldots, m_{2*NLB/SF}$

...

$k^{th}$ LB: $m_{(k-1)*NLB/SF+1}, \ldots, m_{k*NLB/SF}$

...

$N_{LB}^{th}$ LB: $m_{(NLB-1)*NLB/SF+1}, \ldots, m_{NLB*NLB/SF}$

Due to the characteristics of orthogonal codes, it is possible to multiplex control signals of a maximum SF number of UEs by using the same time-frequency resources. It is possible to identify an RS signal of each UE by using the ZC sequence for the RS signal necessary for channel estimation of each UE and operating different time domain cyclic shift values of the ZC sequence for respective UEs.

The following discussion shows a separate operation of control information frequency bands for the "type A" transmission structure and control information frequency bands for the "type C" transmission structure. However, it is also possible to use only one control information frequency band either while selectively using the "type A" or "type C" transmission structure for the control information frequency band or while using only the "type C" transmission structure for the control information frequency band. In the former case, the selection between the "type A" and the "type C" can be performed based on the quantity of control information to be transmitted as described later.

Figure 4:
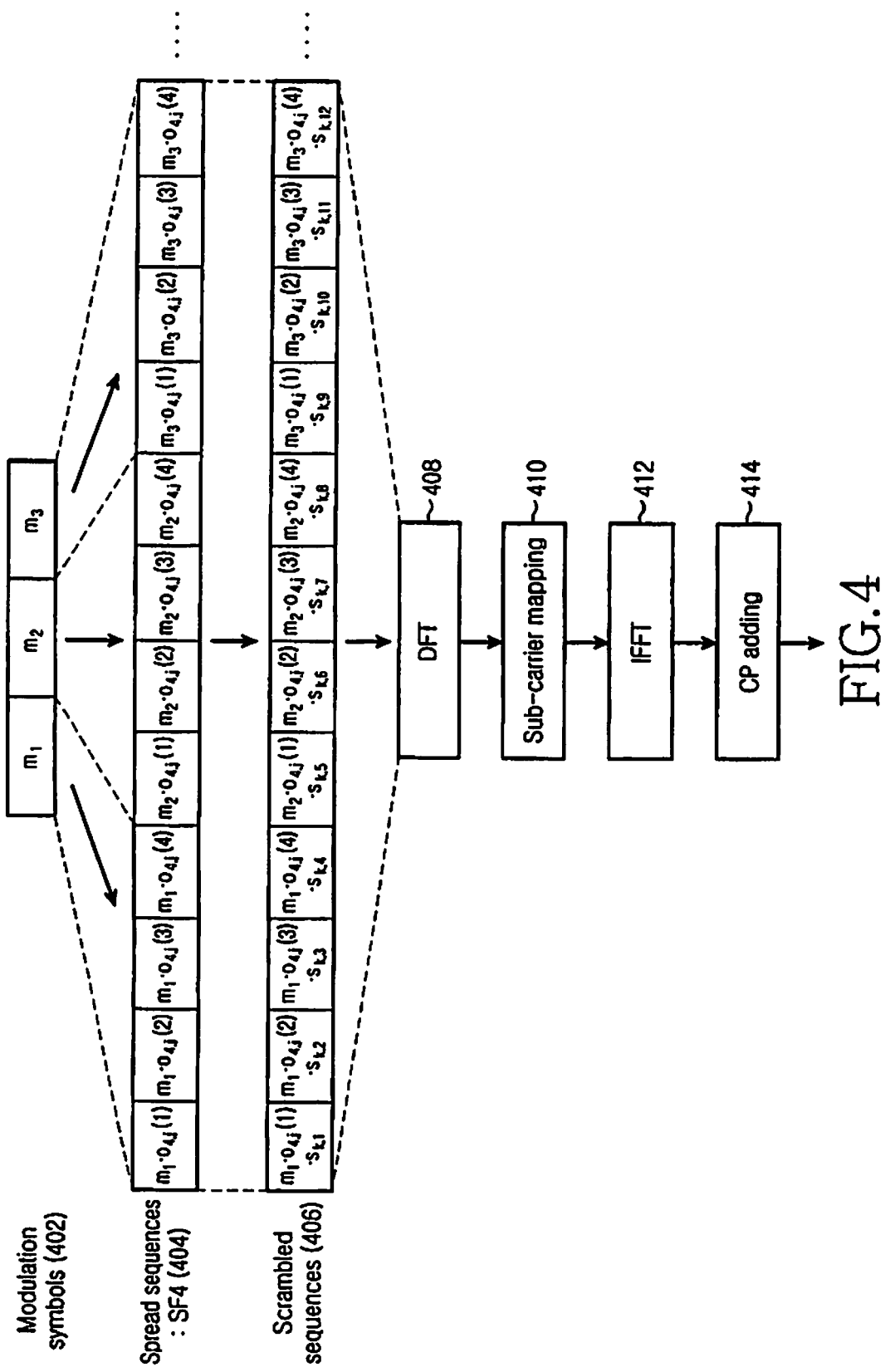
FIG. 4 is a flow diagram illustrating an operation process of generating control information by a "type C" scheme according to an exemplary embodiment of the present invention.

FIG. 4 is a flow diagram illustrating an operation process of generating control information by the "type C" scheme according to an exemplary embodiment of the present invention.

The operation process shown in FIG. 4 corresponds to a process of generating a control channel signal mapped to one LB based on an assumption that a total of 12 LBs are used to transmit control information during one sub-frame, one RU including 12 sub-carriers is used in the frequency domain, and orthogonal codes having an SF with a value of 4 ($o_{4,j}$, wherein j=1, 2, 3, or 4; j refers to an index of each orthogonal code having an SF of 4, and different orthogonal code indexes j are allocated to different UEs) are used.

A UE performs error correction coding and modulation of control information to be transmitted, thereby generating modulation symbols (which include $m_1, m_2, m_3, \ldots$) in step 402. Since SF=4, each of the modulation symbols is spread into four chips. Therefore, the three modulation symbols are spread by orthogonal codes having an SF of 4, so that a total of 12 chips (which include $m_1 \cdot o_{4,j}(1)$, $m_1 \cdot o_{4,j}(2)$, $m_1 \cdot o_{4,j}(3)$, $m_1 \cdot o_{4,j}(4)$, $m_2 \cdot o_{4,j}(1)$, $m_2 \cdot o_{4,j}(2)$, $m_2 \cdot o_{4,j}(3)$, $m_2 \cdot o_{4,j}(4)$, $m_3 \cdot o_{4,j}(1)$, $m_3 \cdot o_{4,j}(2)$, $m_3 \cdot o_{4,j}(3)$, and $m_3 \cdot o_{4,j}(4)$) are generated in step 404, wherein $o_{4,j}(i)$ indicates the $i^{th}$ chip of the $j^{th}$ code from among the orthogonal codes having an SF of 4.

In order to randomize inter-cell interference, the spread signal including the 12 chips may be scrambled according to different scrambling sequences for respective cells in step 406. A scrambling sequence is defined by $S_{k,n}$, wherein k indicates a length of the scrambling sequence and n indicates a chip index of the scrambling sequence. The scrambling sequence is multiplied chip-by-chip by the spread signal. The length of the scrambling sequence may be equal to either the length of the sub-frame or the frame length of 10 ms.

The signal spread and scrambled as described above includes a total of 12 samples for each LB, and is converted into a frequency domain signal including 12 samples through a Discrete Fourier Transform (DFT) in step 408 and then mapped to a frequency domain pre-allocated for "type C" transmission of the control information by a sub-carrier mapper in step 410. Then, through Inverse Fast Fourier Transform (IFFT), the frequency domain signal is converted into a time domain signal in step 412. Then, a Cyclic Prefix (CP) for preventing inter-symbol interference is added to the time domain signal 414, and then the CP-added signal is transmitted after Radio Frequency (RF)-processing the CP-added signal.

In order to enable the "type C" transmission of control information as described above, a Node B notifies a UE of information on a frequency region allocated for the "type C" transmission of control information, orthogonal code information to be used by each UE, and a transmission period of the "type C" transmission of control information. For example, if a UE transmits sub-band CQI information at each sub-frame, it causes too much overhead. Therefore, the UE can sparsely transmit sub-band CQI information with a regular period. Therefore, the Node B may control the transmission period and transmission timing for each UE, so as to enable sharing of limited time-frequency-code resources by a plurality of UEs. The information may be either notified by a Node to a UE through a higher layer signaling or dynamically notified through a physical layer signaling.

Figure 5:
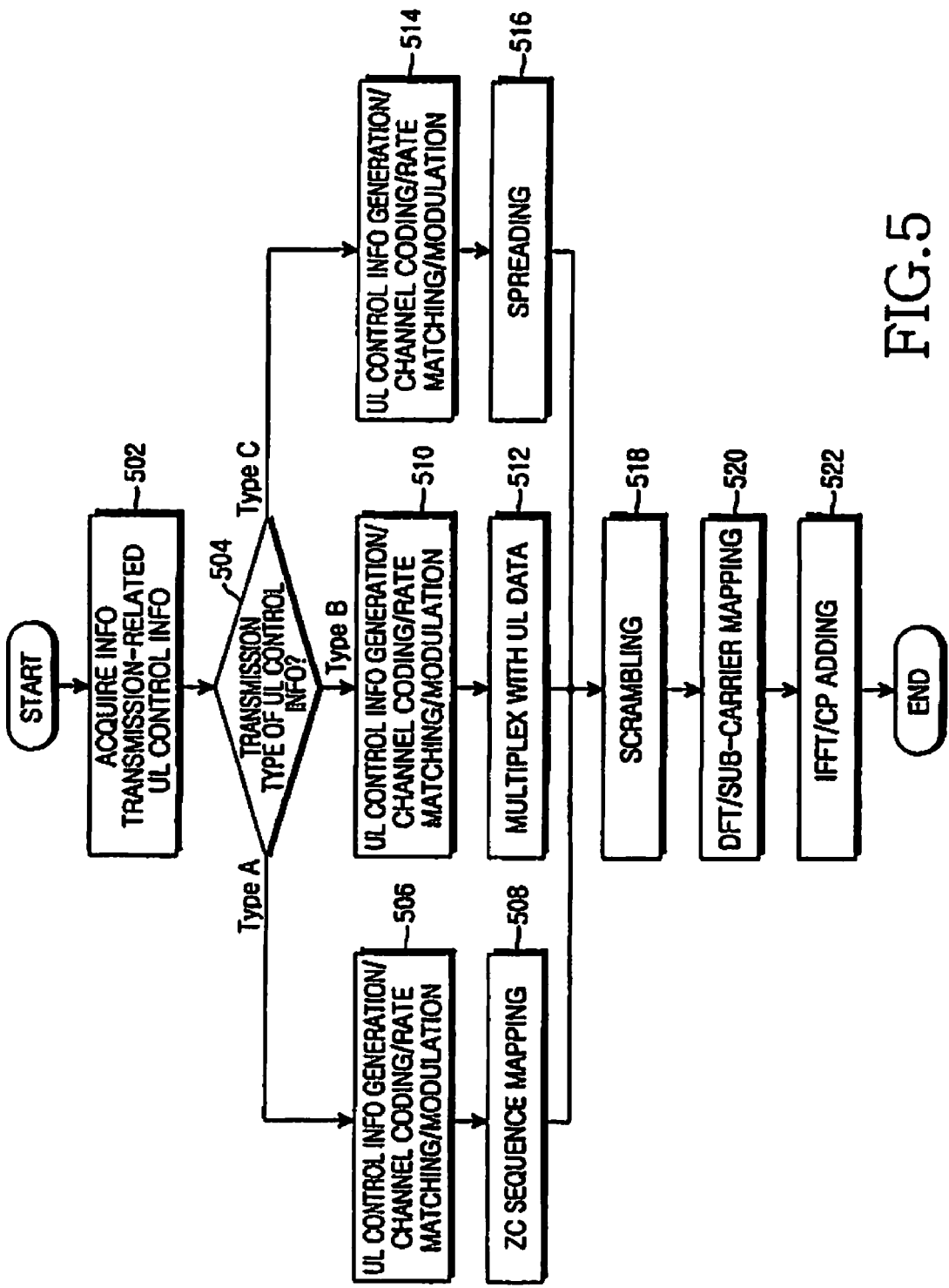
FIG. 5 is a flow diagram illustrating a process of transmitting control information by a UE according to an exemplary embodiment of the present invention.

FIG. 5 is a flow diagram illustrating a process of transmitting control information by a UE according to an exemplary embodiment of the present invention.

Referring to FIG. 5, in step 502, a UE receives various pieces of advance information in relation to uplink control information from a Node B before starting transmission of the control information, and prepares to generate a proper signal indicating that the control information to be transmitted occurs. The advance information may include frequency region information for transmitting "type A" control information, ZC sequence information, a cyclic shift value of a ZC sequence of each UE, frequency region information for transmitting "type C" control information, a transmission period and transmission timing according to the type of control information, and orthogonal code information for each UE.

In step 504, the UE determines the transmission scheme of the control information. An example of standards for the determination is as follows. When there is no uplink data to be transmitted and the quantity of control information is less than or equal to a pre-defined threshold, the UE selects "type A" scheme. When both the control information and data to be transmitted are present in an uplink, the UE selects "type B" scheme. Finally, when there is no uplink data to be transmitted and the quantity of control information is greater larger than the pre-defined threshold or when various types of control information are to be simultaneously transmitted, the UE selects "type C" scheme.

As a result of the determination in step 504, when the UE selects "type A," the UE generates the control information, and sequentially performs channel coding, rate matching, and modulation of the control information, thereby generating control information modulation symbols in step 506. The rate matching refers to puncturing or repeating encoded bits so that the number of encoded bits coincides with the number of bits transmissible through a physical channel. Then, in step 508, the UE applies a cyclic shift to a ZC sequence allocated in advance by the Node B, multiplies the control information modulation symbols by the cyclic-shifted ZC sequence for each LB, and then maps the products of the multiplication to corresponding LBs, thereby generating a control channel signal.

In step 518, in order to randomize inter-cell interference, the generated control channel signal is scrambled, so as to generate a scrambled time domain signal. In step 520, the UE performs DFT on the scrambled time domain signal and sub-carrier maps the scrambled time domain signal to a pre-allocated frequency region, thereby generating a frequency domain signal. In step 522, the UE converts the frequency domain signal into a time domain signal through IFFT, and adds a CP to the time domain signal, thereby generating an SC-FDMA signal. Then, the SC-FDMA signal undergoes RF signal processing and is then transmitted to the Node B.

As a result of the determination in step 504, when the UE selects "type B," the UE generates the control information, and sequentially performs channel coding, rate matching, and modulation of the control information, thereby generating control information modulation symbols in step 510. In step 512, the UE multiplexes the generated control information modulation symbols with data modulation symbols to be transmitted. Then, the multiplexed signal is transmitted to the Node B after being processed through steps 518 to 522. The multiplexed signal generated according to the "type B" scheme, which includes multiplexed data and control information, undergoes DFT and IFFT and is then mapped to time-frequency resources scheduled by the Node B.

As a result of the determination in step 504, when the UE selects "type C," the UE generates the control information, and sequentially performs channel coding, rate matching, and modulation of the control information, thereby generating control information modulation symbols in step 514. In step 516, the UE generates a control channel signal by spreading the generated control information modulation symbols by using allocated orthogonal codes. Then, the control channel signal generated from the spread control information modulation symbols is transmitted to the Node B after being processed through steps 518 to 522. The control channel signal generated according to the "type C" scheme is mapped to a frequency band allocated for the "type C."

The scrambling in step 518 may be performed before modulation of the signal rate-matched in each of steps 506, 510, and 514. A scrambling operation before modulation as described above also can randomize the inter-cell interference. The same can be said also in the following embodiments.

Hereinafter, specific embodiments will be discussed in order describe a main operation principle of the present invention.

1$^{st}$ Embodiment

Figure 6A:
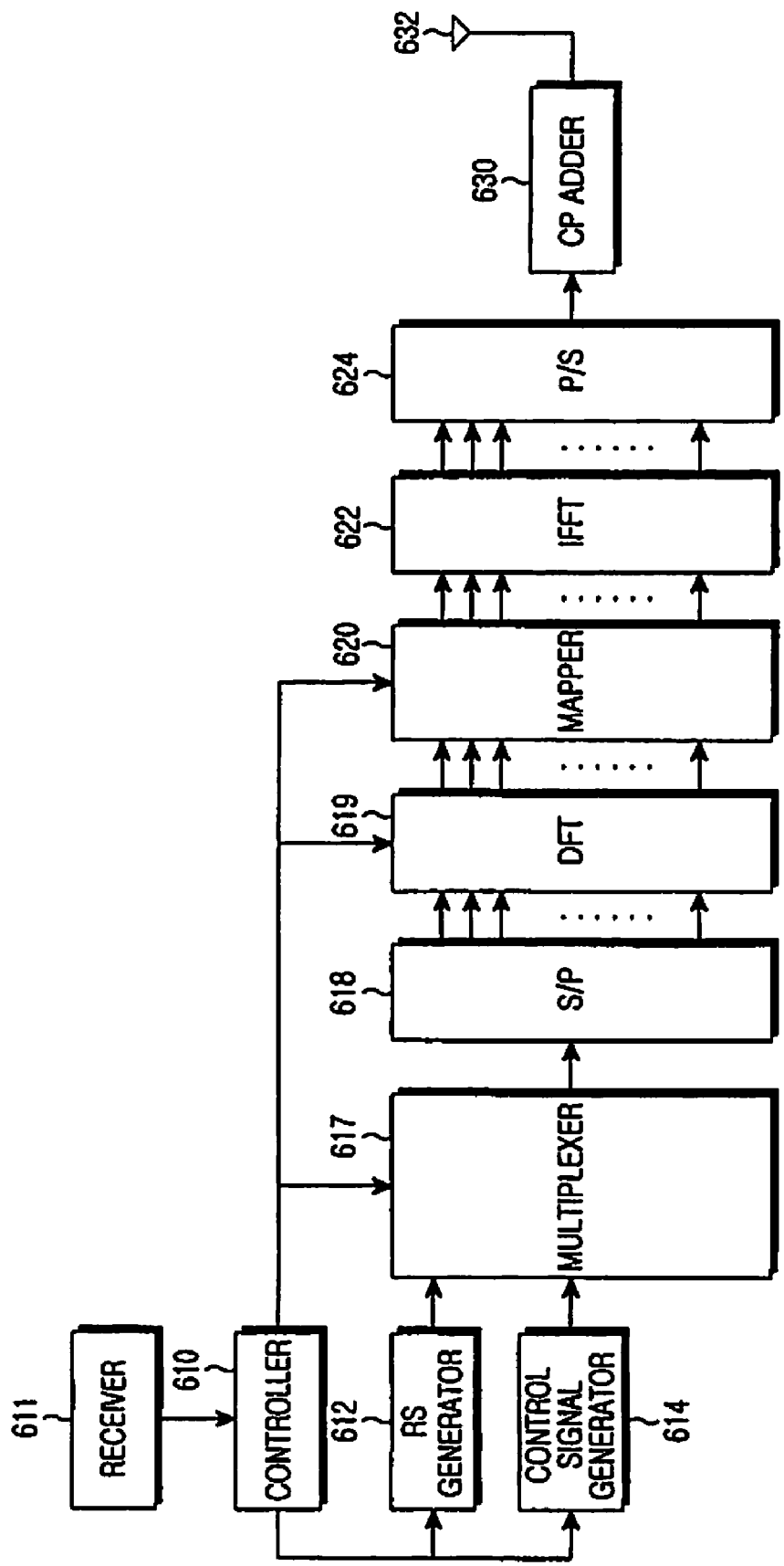
FIGS. 6A and 6B are block diagrams illustrating a transmission apparatus of a UE for transmitting control information by the "type C" scheme according to an exemplary embodiment of the present invention.
Figure 6B:
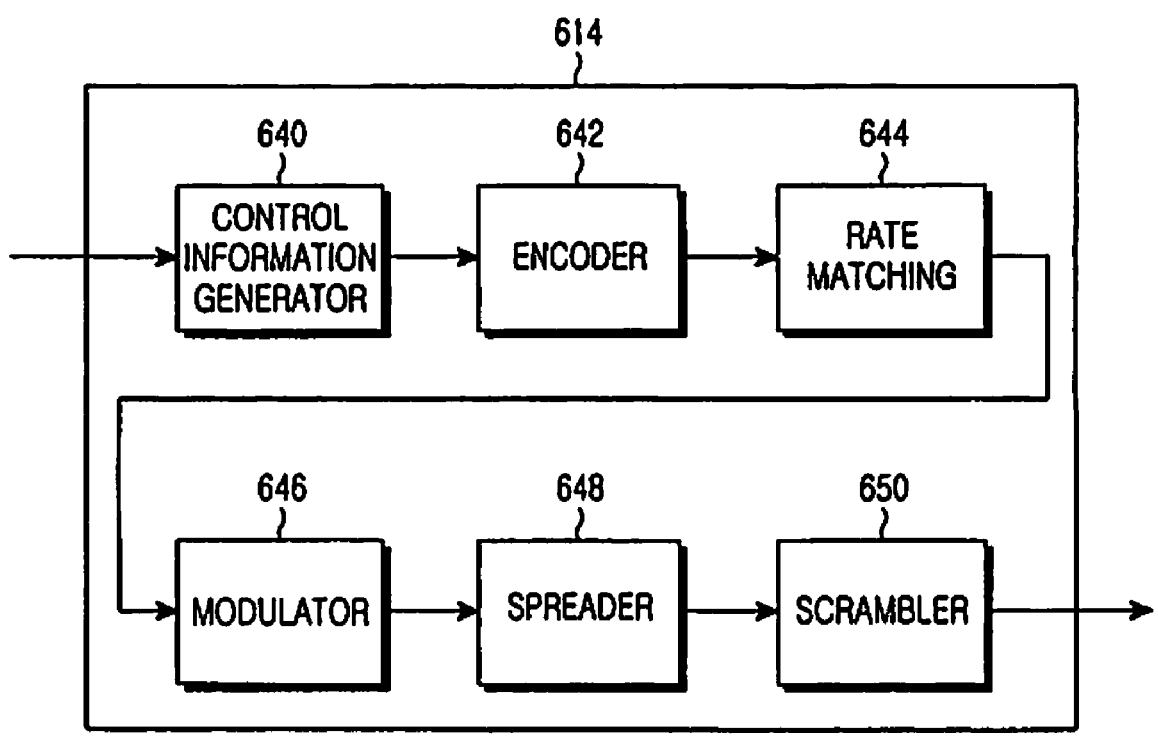

FIGS. 6A and 6B are block diagrams illustrating a transmission apparatus of a UE for transmitting control information by the "type C" scheme according to an exemplary embodiment of the present invention.

Referring to FIG. 6A, the transmission apparatus includes a controller 610, a downlink control information receiver 611, an RS generator 612, a control signal generator 614, a multiplexer 617, a Serial-to-Parallel (S/P) converter 618, a DFT block 619, a mapper 620, an IFFT block 622, a Parallel-to- Serial (P/S) converter 624, a CP adder 630, and an antenna 632. In FIG. 6A, elements related to uplink data transmission are omitted.

The UE preliminarily receives advance information in relation to transmission of uplink control information from a Node B through the downlink control information receiver 611, and applies the advance information to the controller 610 so as to generate a proper signal indicating that the control information to be transmitted occurs. The advance information includes frequency region information for a transmission of the control information, ZC sequence information for a transmission of an RS and a cyclic shift value of a ZC sequence of each UE, transmission period and transmission timing according to the type of control information, and orthogonal code information for each UE.

The controller 610 controls the general operation of the transmission apparatus and transmits advance information required by important blocks, such as the multiplexer 617, the DFT block 619, the mapper 620, the RS generator 612, and the control signal generator 614. The advance information input to the RS generator 612 includes ZC sequence information allocated to the UE and time domain cyclic shift information. The advance information input to the control signal generator 614 in relation to transmission of uplink control information includes frequency region information for transmission of the control information, ZC sequence information for transmission of an RS and a cyclic shift value of a ZC sequence of each UE, transmission period and transmission timing according to the type of control information, and orthogonal code information for each UE.

The multiplexer 617 receives timing information on the control information and the RS from the controller 610, and selects and outputs an RS signal and a control signal generated at pre-defined LB locations in the RS generator 612 and the control signal generator 614, respectively. To this end, the mapper 620 for mapping the signals to actual frequency resources receives frequency allocation information from the controller 610.

The output signal of the multiplexer 617 is converted into parallel signals by the S/P converter 618, and the converted parallel signals are input to the DFT block 619. The input/output size of the DFT block 619 varies according to the quantity of control information input from the controller 610, and the output of the DFT block 619 is input to the mapper 620 and then mapped to frequency resources of the frequency region for the control information. The output of the mapper 620 is converted to a time domain signal by the IFFT block 622, and is then converted to a serial signal by the P/S converter 624. Then, a CP for preventing inter-symbol interference is added to the serial signal by the CP adder 630, and is then transmitted through the antenna 632.

FIG. 6B is a block diagram illustrating the control signal generator 614 according to an exemplary embodiment of the present invention in more detail.

Referring to FIG. 6B, control information is generated in accordance with a format of the control information to be transmitted by the control information generator 640. For example, if sub-band CQI information is to be transmitted, control information indicating the sub-band CQI information is configured according to a pre-defined format about how to send CQI information on a certain sub-band from among all the sub-bands. The encoder 642 provides error correction capability by channel coding the control information. The channel coding scheme or coding rate is determined according to the type of the control information. The rate matching block 644 punctures or repeats the channel coded bit stream in accordance with the physical channel bit number. The modulator 646 generates modulation symbols by modulating the output bit stream of the rate matching block 644. The generated modulation symbols are spread by the spreader 648 through an operation with orthogonal codes having a spreading factor allocated by the Node B. In order to randomize the quantity of inter-cell interference, the spread signal can be additionally scrambled by the scrambler 650. As described above, the scrambler 650 may be located before the modulator 646.

Through spreading, it becomes possible to identify control information of each UE. Further, change of the SF of the orthogonal code makes it possible to control the transmission bit rate of the control information. For example, when one RU is allocated for transmission of the control information and the RU includes 12 sub-carriers, it is possible to transmit three (i.e., 12/4) modulation symbols at one LB by using orthogonal codes having an SF of 4. If the control information is transmitted through 12 LBs during one sub-frame, it is possible to transmit a total of 36 control information modulation symbols, which corresponds to a symbol rate of 36 kbps (symbols per second). Therefore, when the quantity of control information to be transmitted changes according to the type of the control information, the transmission rate of the control information to be transmitted can be adjusted by adjusting the SF as described above.

Figure 7:
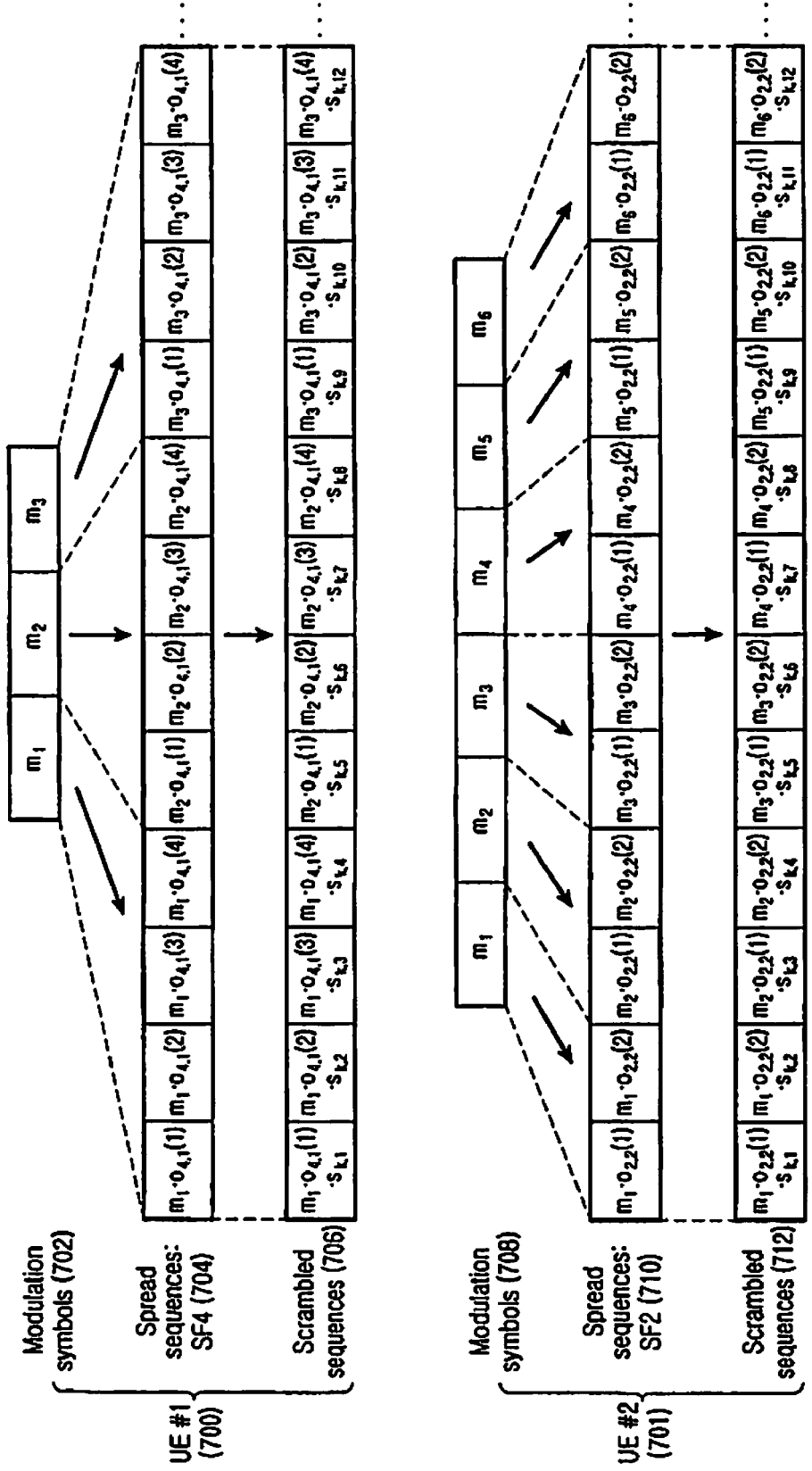
FIG. 7 is a flow diagram illustrating an operation process of generating control information for each user according to an exemplary embodiment of the present invention.

FIG. 7 is a flow diagram illustrating an operation process of generating control information for each user according to an exemplary embodiment of the present invention.

Referring to FIG. 7, UE #1 700 and UE #2 701 use one RU corresponding to the same time-frequency resource in transmitting the control information according to the "type C" scheme. Further, UE #1 700, which has a relatively small quantity of control information to be transmitted, uses an orthogonal code $o_{4,j}$, the SF of which is 4, and UE #2 701, which has a relatively large quantity of control information to be transmitted, uses an orthogonal code $o_{2,2}$, the SF of which is 2. As used herein, $o_{i,j}$ refers to the $j^{th}$ orthogonal code from among orthogonal codes having a length of i, and each orthogonal code includes m chips. Representative examples of the orthogonal codes include an OVSF code used in a Wideband Code Division Multiple Access (WCDMA) system.

Since both the UE #1 700 and the UE #2 701 use 12 sub-carriers for each LB, a maximum of 12 samples (or chips) of control information can be mapped for each LB.

In the case of UE #1 700, each modulation symbol is spread into four chips by an orthogonal code having an SF of 4. Since one LB can include a maximum of 12 chips, a maximum of three (i.e., 12/4) modulation symbols can be mapped for each LB. That is, in the case of UE #1 700, control information modulation symbols are mapped to each LB three symbols-by-three symbols, in step 702. Then, each of the modulation symbols (which include $m_1$, $m_2$, $m_3$, . . . ) is spread by an orthogonal code having an SF of 4, so that a total of 12 chips (which include $m_1 \cdot o_{4,1}(1)$, $m_1 \cdot o_{4,1}(2)$, $m_1 \cdot o_{4,1}(3)$, $m_1 \cdot o_{4,1}(4)$, $m_2 \cdot o_{4,1}(1)$, $m_2 \cdot o_{4,1}(2)$, $m_2 \cdot o_{4,1}(3)$, $m_2 \cdot o_{4,1}(4)$, $m_3 \cdot o_{4,1}(1)$, $m_3 \cdot o_{4,1}(2)$, $m_3 \cdot o_{4,1}(3)$, and $m_3 \cdot o_{4,1}(4)$) are generated (step 704), wherein $o_{4,1}(i)$ indicates the $i^{th}$ chip of the $1^{st}$ code from among the orthogonal codes having an SF of 4.

In order to randomize inter-cell interference, the spread signal including the 12 chips may then be scrambled by different scrambling sequences for respective cells, in step 706. A scrambling sequence is defined by $S_{k,n}$, wherein k indicates a length of the scrambling sequence and n indicates a chip index of the scrambling sequence. The scrambling sequence is multiplied chip-by-chip by the spread signal. The length of the scrambling sequence may be equal to either the length of the sub-frame or the frame length of 10 ms. The scrambled control channel signal generated as described above is applied to the DFT block and is then converted into an SC-FDMA signal.

In the case of UE #2 701, each modulation symbol is spread into two chips by an orthogonal code having an SF of 2. Since one LB can include a maximum of 12 chips, a maximum of six (=12/2) modulation symbols can be mapped for each LB. That is, in the case of UE #2 701, control information modulation symbols are mapped to each LB six symbols by six symbols (step 708). Then, each of the modulation symbols (which include $m_1, m_2, m_3, m_4, m_5, m_6, \ldots$) is spread by an orthogonal code having an SF of 2, so that a total of 12 chips (which include $m_1 \cdot o_{2,2}(1), m_1 \cdot o_{2,2}(2), m_2 \cdot o_{2,2}(1), m_2 \cdot o_{2,2}(2), m_3 \cdot o_{2,2}(1), m_3 \cdot o_{2,2}(2), m_4 \cdot o_{2,2}(1), m_4 \cdot o_{2,2}(2), m_5 \cdot o_{2,2}(1), m_5 \cdot o_{2,2}(2), m_6 \cdot o_{2,2}(1),$ and $m_6 \cdot o_{2,2}(2)$) are generated, in step 710.

As in UE #1 700, in order to randomize inter-cell interference, the spread signal including the 12 chips may then be scrambled by different scrambling sequences for respective cells, in step 712. The scrambling sequence is defined by $S_{k,n}$, wherein k indicates a length of the scrambling sequence and n indicates a chip index of the scrambling sequence. The scrambling sequence is multiplied chip-by-chip by the spread signal. The scrambled control channel signal generated as described above is applied to the DFT block and is then converted into an SC-FDMA signal.

Figure 8A:
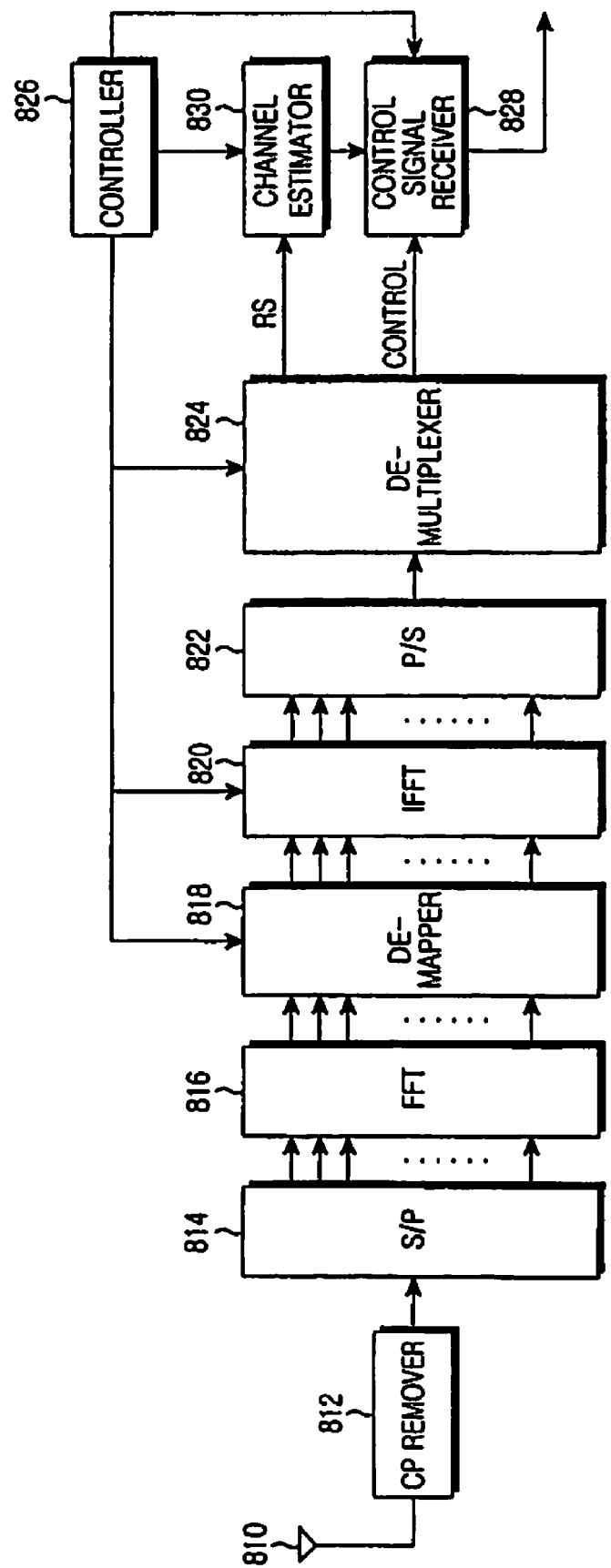
FIGS. 8A and 8B are block diagrams illustrating a reception apparatus of a Node B for receiving control information by the "type C" scheme according to an exemplary embodiment of the present invention.
Figure 8B:
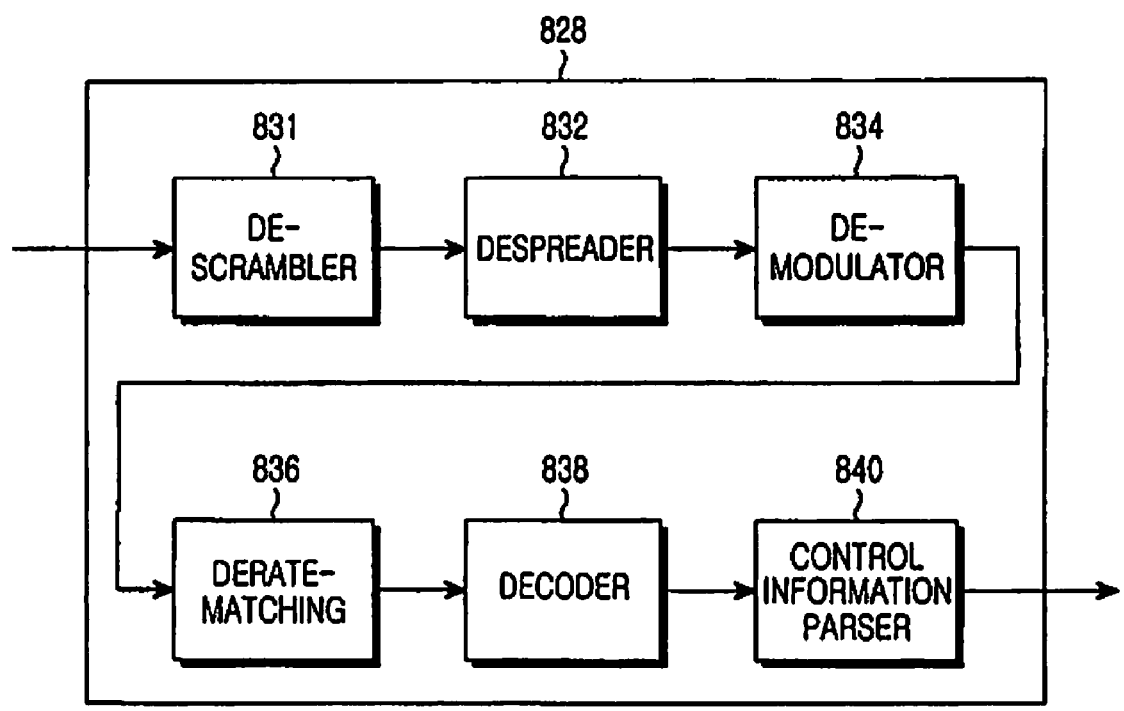

FIGS. 8A and 8B are block diagrams illustrating a reception apparatus of a Node B for receiving control information by the "type C" scheme according to an exemplary embodiment of the present invention.

Referring to FIG. 8A, the reception apparatus includes the antenna 810, the CP remover 812, the S/P converter 814, the FFT block 816, the demapper 818, the IFFT 820, the P/S converter 822, the demultiplexer 824, the controller 826, the control signal receiver 828, and the channel estimator 830. In FIG. 8, elements related to uplink data transmission/reception are omitted.

The controller 826 controls a general operation of the reception apparatus and provides advance information required by important blocks, such as the demultiplexer 824, the IFFT 820, the demapper 818, the control signal receiver 828, and the channel estimator 830. Various pieces of advance information relating to uplink control information, which are input to the control signal receiver 828, include various parameters necessary for decoding control information for each UE and orthogonal code information for each UE. The advance information input to the channel estimator 830 may include time domain cyclic shift information, and ZC sequence information allocated to a UE by which the advance information is to be received.

In order to classify a control channel signal, an RS signal, etc. input to the control signal receiver 828 and the channel estimator 830, the demultiplexer 824 receives timing information for the control channel signal and the RS signal from the controller 826. The demapper 818 for extracting the signals from actual frequency resources receives frequency allocation information, etc. from the controller 826.

The Node B receives a wireless signal including uplink control information through the antenna 810 from the UE. Then, the CP remover 812 removes a CP from the wireless signal, and the S/P converter 814 converts the CP-removed signal into parallel signals and inputs the parallel signals to the FFT block 816 for FFT of the signals. Then, the FFTed signals output from the FFT block 816 are demapped by the demapper 818 and are then converted to time domain signals by the IFFT 820. The input/output size of the IFFT 820 varies according to the quantity of control information input from the controller 826. The output of the IFFT 820 is converted to a serial signal by the P/S converter 822 and is divided into a control channel signal and an RS signal by the demultiplexer 824. Then, the RS signal and the control channel signal are input to the channel estimator 830 and the control signal receiver 828, respectively. The channel estimator 830 acquires a channel estimation value from the RS signal and provides the acquired value to the control signal receiver 828 for channel compensation of the control channel signal. The control signal receiver 828 channel-compensates the control channel signal by using the channel estimation value, and then acquires control information transmitted by the UE from the channel-compensated control signal.

FIG. 8B is a block diagram illustrating the control signal receiver 828 according to the present invention in more detail.

Referring to FIG. 8B, the descrambler 831 performs descrambling on a control signal provided by the demultiplexer 824 by using a scrambling code pre-promised between the UE and the Node B. The despreader 832 despreads the descrambled signal by using an orthogonal code having a spreading factor allocated to a UE requiring acquisition of the control information, thereby removing signals of other UEs and extracting a signal including control information required to be acquired. The demodulator 834 demodulates the output of the despreader 832, and the de-rate-matching block 836 generates a completely encoded bit stream by repeating or puncturing the output of the demodulator 834. Further, the decoder 838 performs channel decoding of the encoded bit stream. The control information analyzer 840 analyzes the meaning of the control information from the decoded bit stream. For example, when the control information is CQI information, the control information analyzer 840 can recognize which sub-band is related to the control information and the channel state of the sub-band.

The present invention provides a method and an apparatus for transmitting uplink control information in a next generation mobile communication system. Specifically, when there is a large quantity of control information, the control information is spread by orthogonal codes in the time domain, so as to increase the transmission bit rate and make it possible to discriminate between users.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting control information in a Single Carrier-Frequency Division Multiple Access (SC-FDMA) system, the method comprising the steps of:
   generating first control information to be transmitted;
   spreading control information symbols including the first control information by an orthogonal code that has an index of the orthogonal code allocated to each User Equipment (UE);
   performing a Discrete Fourier Transform (DFT) on the spread signal and mapping the Discrete Fourier Transformed signal to a first frequency region allocated for a transmission of the first control information, thereby generating a frequency domain signal;
   mapping the frequency domain signal to SC-FDMA symbols through Inverse Fast Fourier Transform (IFFT); and
   adding Cyclic Prefix (CP) for preventing inter-symbol interference to the SC-FDMA symbols and then transmitting a CP-added signal to the Node B, wherein the index and a spreading factor of the orthogonal code are variable and the index of the orthogonal code is allocated to each UE within the first frequency region.

2. The method of claim 1, wherein the orthogonal code includes one of Orthogonal Variable Spreading Factor (OVSF) codes and Walsh codes.

3. The method of claim 1, further comprising scrambling the spread signal by using a different scrambling code according to a cell before performing the DFT.

4. The method of claim 1, wherein when there is no uplink data to be transmitted and a quantity of control information exceeds a pre-defined threshold or when the first control information includes various types of information, the first control information is spread in a time domain by the orthogonal code.

5. The method of claim 4, further comprising, when there is no uplink data to be transmitted and a quantity of second control information is less than or equal to the pre-defined threshold, spreading the second control information by using a Zadoff Chu (ZC) sequence cyclic-shifted according to resource blocks, each of which indicates at least one time interval used for a transmission of the second control information, and then transmitting the spread second control information through a second frequency region different from the first frequency region.

6. The method of claim 5, further comprising, when there is uplink data to be transmitted, performing Time Division Multiplexing (TDM) of the uplink data with third control information, and then transmitting the Time Division Multiplexed data and third control information through a third frequency region different from the first frequency region and the second frequency region.

7. A User Equipment (UE) apparatus for transmitting control information in a Single Carrier-Frequency Division Multiple Access (SC-FDMA) system, the UE apparatus comprising:
a control signal generator for spreading control information symbols including first control information to be transmitted by an orthogonal code that has an index of the orthogonal code allocated to each User Equipment (UE);
a Discrete Fourier Transform (DFT) block for performing DFT on a spread signal;
a mapper for mapping the Discrete Fourier Transformed signal to a first frequency region allocated for a transmission of the first control information, thereby generating a frequency domain signal;
an Inverse Fast Fourier Transform (IFFT) block for mapping the frequency domain signal to SC-FDMA symbols through IFFT; and
a Cyclic Prefix (CP) adder for adding CP for preventing inter-symbol interference to the SC-FDMA symbols and then transmitting a CP-added signal to the Node B,
wherein the index and a spreading factor of the orthogonal code are variable and the index of the orthogonal code is allocated to each UE within the first frequency region.

8. The UE apparatus of claim 7, wherein the orthogonal code includes one of Orthogonal Variable Spreading Factor (OVSF) codes and Walsh codes.

9. The UE apparatus of claim 7, wherein the control channel signal generator scrambles the spread signal by using a different scrambling code according to a cell before performing the DFT.

10. The UE apparatus of claim 7, wherein when there is no uplink data to be transmitted and a quantity of control information exceeds a pre-defined threshold or when the first control information includes various types of information, the first control information is spread in a time domain by the orthogonal code.

11. The UE apparatus of claim 10, wherein:
when there is no uplink data to be transmitted, and a quantity of second control information is less than or equal to the pre-defined threshold, the control channel signal generator spreads the second control information by using a Zadoff Chu (ZC) sequence cyclic-shifted according to resource blocks, each of which indicates at least one time interval used for a transmission of the second control information and generates a control channel signal;
the DFT block performs DFT on the control channel signal; and
the mapper maps the Discrete Fourier Transformed control channel signal to a second frequency region different from the first frequency region.

12. The UE apparatus of claim 11, further comprising a multiplexer for, when there is uplink data to be transmitted, performing Time-Division Multiplexing (TDM) of the uplink data with third control information,
wherein the DFT block performs DFT on the control channel signal; and
the mapper maps the multiplexed and Discrete Fourier Transformed control channel signal to a third frequency region different from the first frequency region and the second frequency region.

13. A method for receiving control information in a Single Carrier-Frequency Division Multiple Access (SC-FDMA) system, the method comprising the steps of:
extracting SC-FDMA symbols from a received signal by removing Cyclic Prefix (CP) for preventing inter-symbol interference from the received signal;
performing a Fast Fourier Transform (FFT) on the SC-FDMA symbols;
demapping a signal mapped to a first frequency region allocated for a transmission of first control information from a Fast Fourier Transformed signal;
converting the demapped signal to a time domain signal through Inverse Fast Fourier Transform (IFFT);
extracting a control channel signal by demultiplexing the time domain signal; and
acquiring the first control information by despreading the control channel signal by an orthogonal code that has an index allocated to a each User Equipment (UE),
wherein the index and a spreading factor of the orthogonal code are variable and the index of the orthogonal code is allocated to each UE within the first frequency region.

14. The method of claim 13, wherein the orthogonal code includes one of Orthogonal Variable Spreading Factor (OVSF) codes and Walsh codes.

15. The method of claim 13, further comprising descrambling the control channel signal by using different scrambling code according to a cell before despreading the control channel signal by the orthogonal codes.

16. The method of claim 13, wherein when there is no received uplink data and a quantity of the first control information exceeds a pre-defined threshold or when the first control information includes various types of information, the first control information is acquired by spreading the control channel signal by the orthogonal code.

17. The method of claim 16, further comprising, when there is no received uplink data and a quantity of second control information is less than or equal to the threshold, acquiring the second control information by despreading a signal mapped to a second frequency region different from the first frequency region by using a Zadoff Chu (ZC) sequence.

18. The method of claim 17, further comprising, when there is received uplink data, performing Time Division Multiplexing (TDM) on a signal mapped to a third frequency region different from the first frequency region and the second frequency region, thereby extracting third control information.

19. A Node B apparatus for receiving control information in a Single Carrier-Frequency Division Multiple Access (SC-FDMA) system, the Node B comprising:
 a Cyclic Prefix (CP) remover for extracting SC-FDMA symbols from a received signal by removing CP for preventing inter-symbol interference from the received signal;
 a Fast Fourier Transform (FFT) block performing an FFT on the SC-FDMA symbols;
 a demapper for demapping a signal mapped to a first frequency region allocated for a transmission of first control information from an Fast Fourier Transformed signal;
 an Inverse Fast Fourier Transform (IFFT) block for converting the demapped signal to a time domain signal through IFFT;
 a demultiplexer for extracting a control channel signal by demultiplexing the time domain signal; and
 a control channel signal receiver for acquiring the first control information by despreading the control channel signal by an orthogonal code that has an index of the orthogonal code allocated to each User Equipment (UE),
 wherein the index and a spreading factor of the orthogonal code are variable and the index of the orthogonal code is allocated to each UE within the first frequency region.

20. The Node B apparatus of claim 19, wherein the orthogonal code includes one of Orthogonal Variable Spreading Factor (OVSF) codes and Walsh codes.

21. The Node B apparatus of claim 19, wherein the control channel signal receiver descrambles the control channel signal by using different scrambling code according to a cell before despreading the control channel signal by the orthogonal codes.

22. The Node B apparatus of claim 19, wherein when there is no received uplink data and a quantity of the first control information exceeds a pre-defined threshold or when the first control information includes various types of information, the first control information is acquired by despreading the control channel signal by the orthogonal code.

23. The Node B apparatus of claim 22, wherein:
 when there is no received uplink data and a quantity of second control information is less than or equal to the threshold, the demapper demaps a signal mapped to a second frequency region different from the first frequency region; and
 the control channel signal receiver despreads the signal mapped to the second frequency region by using a Zadoff Chu (ZC) sequence, thereby acquiring the second control information.

24. The Node B apparatus of claim 23, wherein:
 when there is received uplink data, the demapper demaps a signal mapped to a third frequency region different from the first frequency region and the second frequency region; and the demultiplexer performs Time Division Multiplexing (TDM) on the signal mapped to the third frequency region, thereby extracting third control information.

\* \* \* \* \*